United States Patent Office 3,018,216
Patented Jan. 23, 1962

---

3,018,216
2-(O,O - DIALKYLPHOSPHORO - DITHIOYL-METHYLMERCAPTO)-CARBAMATES AND CARBANILATES
Richard C. Maxwell, San Jose, and Donald G. Stoffey, El Cerrito, Calif., assignors to Stauffer Chemical Company, New York, N.Y., a corporation of Delaware
No Drawing. Filed Apr. 3, 1961, Ser. No. 99,997
14 Claims. (Cl. 167—22)

This invention relates to certain novel chemical compounds and to the use of such compounds as insecticides and acaricides. The compounds are particularly valuable for their systemic and miticidal properties. More specifically, the invention relates to compounds of the formula:

$$(R^1O)_2\overset{S}{\overset{\|}{P}}SCH_2SCH_2CH_2O\overset{O}{\overset{\|}{C}}NR^2R^3$$

wherein $R^1$ is a lower alkyl radical, $R^2$ and $R^3$ are selected from hydrogen, phenyl, and lower alkyl radicals.

The compounds of the present invention can be made in accordance with the following illustrative examples (code numbers have been assigned to each compound and are used hereinafter for convenience).

EXAMPLE 1

*R-4243—2-(O,O-diethylphosphorodithioylmethylmercapto)-ethyl carbamate*

An amount (19 g.) of 2-(O,O-diethylphosphorodithioylmethylmercapto)-ethanol, prepared by refluxing 23 g. of S-chloromethyl-O,O-diethylphosphorodithioate with 10 g. of sodium hydroxyethylmercaptide in 150 ml. of ethanol for three hours, was allowed to react with an excess of phosgene in 50 ml. of chloroform. After four hours the excess phosgene, as well as the hydrogen chloride, were moved by means of a rotary evaporator. The resulting solution was treated with excess anhydrous ammonia at a temperature less than 15° C. The resulting mixture was washed with water three times. The solvent was removed in a rotary evaporator. There remained 14 g. (64%) of crude product. The product was purified by extracting with cyclo hexane four times. In this way 11.5 g. of purified product, $n_D^{30}$ 1.5418, and 2 g. of impurities, $n_D^{30}$ 1.5223, were obtained. A portion of the product was purified further by chromatographing it on a magnesium silicate column using progressively more polar solvents. The material in the center cuts proved to be essentially pure R–4243, $n_D^{30}$ 1.5460. The infrared spectrum of the chromatographed product contained bands for N–H (2.8–9μ), C=O (5.8μ) and bands for

(9.3, 9.9, 10.4, 12.1 and 12.7μ). Anal.: Calc. for $C_8H_{18}NO_4PS_3$: C, 30.08%; H, 5.68%; N, 4.39%. Found: C, 30.19%; H, 5.58%; N, 4.59%.

EXAMPLE 2

*R-4540—2-(O,O-diethylphosphorodithioylmethylmercapto)-ethyl N,N-dimethylcarbamate*

In the same manner as Example 1, 10 g. of 2-(O,O-diethylphosphorodithioylmethylmercapto)-ethanol was allowed to react with excess phosgene and then excess dimethylamine to give, upon working up, 10.6 g. (84%) of an amber liquid, $n_D^{30}$ 1.5508.

EXAMPLE 3

*R-4541—2-(O,O-diethylphosphorodithioylmethylmercapto)-ethyl N-ethylcarbamate*

In the same manner as Example 1, 10 g. of 2-(O,O-diethylphosphorodithioylmethylmercapto)-ethanol was allowed to react with excess phosgene and then excess ethylamine to give, upon working up, 10.3 g. (82%) of an amber liquid, $n_D^{30}$ 1.5320.

EXAMPLE 4

*R-4542—2-(O,O-diethylphosphorodithioylmethylmercapto)-ethyl N-isopropylcarbamate*

In the same manner as Example 1, 10 g. of 2-(O,O-diethylphosphorodithioylmethylmercapto)-ethanol was allowed to react with excess phosgene and then excess isopropylamine to give, upon working up, 7.2 g. (55%) of a dark amber liquid, $n_D^{30}$ 1.5263.

EXAMPLE 5

*R-4543—2-(O,O-diethylphosphorodithioylmethylmercapto)-ethyl carbanilate*

An amount (8.4 g.) of 2-(O,O-diethylphosphorodithioylmethylmercapto)-ethanol was allowed to react with 3.6 g. of phenylisocyanate. The mixture became mildly exothermic. After heating at 70° C. for one hour there was obtained 11.2 g. (93%) of a pale amber liquid, $n_D^{30}$ 1.5678.

EXAMPLE 6

*R-4662—2-(O,O-diethylphosphorodithioylmethylmercapto)-ethyl N-butylcarbamate*

In the same manner as Example 5, 13.8 g. of 2-(O,O-diethylphosphorodithioylmethylmercapto)-ethanol was allowed to react with 5.0 g. of butylisocyanate to give 16.8 g. (89%) of a pale amber liquid $n_D^{30}$ 1.5182.

The compounds have been tested as insecticides and as acaricides according to the following methods:

*Acaricidal evaluation test.*—The two-spotted mite, *Tetranychus telarius* (Linn.) is employed in tests for acaricides. Young pinto bean plants are infested with several hundred mites. Dispersions of test compounds are prepared by dissolving 0.12 gram of the toxic material in ten milliliters of acetone. This solution is then diluted with water containing 0.0175% v./v. of Tween ® 20, an emulsifier, the amount of water being sufficient to give concentrations of active ingredient ranging from 0.12% to 0.005%. The test suspensions are then sprayed on the infested pinto bean plants. After seven and fourteen days, the plants are examined both for post-embryonic forms of the mite as well as for eggs. The percentage of kill is determined by comparison with control plants which have not been sprayed and the LD–50 value calculated using well-known procedures. LD–50 values are reported under the columns "2SM" in the table; "PE" indicates the post-embryonic forms while "E" indicates eggs.

mine living and dead insects. The LD-50 values are calculated using well known procedures.

| Code | HF | Roach, percent | MWB, percent | CFB | 2SM, PE, percent | 2SM, E, percent | 2SM, Systemic, p.p.m. |
|---|---|---|---|---|---|---|---|
| R-4243 | 10 µg. | <.05 | <.05 | 10 µg. | 0.001 | 0.001 | 0.2 |
| R-4540 | <50 >10 µg. | .05 | .05 | <.1% | <.01 | <.01 | 0.71 |
| R-4541 | <50 >10 µg. | <.05 >.01 | <.05 >.01 | <.1% | <.01 | .01 | 0.5 |
| R-4542 | <50 >10 µg. | .01 | <.05 >.01 | <.1% | <.01 | .01 | 0.75 |
| R-4543 | 50 µg. | 0.1 | 0 | 0 | <.05 | <.1 >.05 | <10 >1 |
| R-4662 | <.1% | 0.1 | 0 | 0 | <.12 | <.12 | |

*Systemic toxicity evaluation against two-spotted mites.*—Pinto bean plants in the primary leaf stage are placed in 250 ml. capacity Erlenmeyer flasks, one plant per flask. A portion of the test compound is dissolved in 10 ml. of acetone. This solution is then diluted with distilled water, the amount of water being sufficient to give concentrations of active ingredient ranging from one hundred parts per million (p.p.m.) to 0.1 part per million. The final volume of test dispersion per flask is 200 ml. The treated plants are infested with several hundred two-spotted mites, *Tetranychus telarius* (Linn.). The results are reported in the table under "2SM Systemic."

After seven and fourteen days, the plants are examined both for post embryonic forms of the mite as well as for eggs. The percentage of kill is determined by comparison with control plants which have been placed in distilled water only. Again, the LD-50 value is calculated and reported under the columns "2SM Systemic" in the table.

*Insecticidal evaluation tests.*—Four insect species are subjected to evaluation tests for insecticides:

(1) American cockroach (Roach) *Periplaneta americana* (Linn.)
(2) Large milkweed bug (MWB) *Oncopeltus fasciatus* (Dallas)
(3) Confused flour beetle (CFB) *Tribolium confusam* (Duval)
(4) Housefly (HF) *Musca domestica* (Linn.)

The procedure for the insects is similar to the miticidal testing procedure. Test insects are caged in cardboard mailing tubes 3⅛" in diameter and 2⅝" tall. The mailing tubes are supplied with cellophane bottoms and screened tops. Ten to twenty-five insects are used per cage. Food and water are supplied in each cage. The confused flour beetle, however, are confined in petri dishes without food. The caged insects are sprayed with the active compound at various concentrations. After twenty-four and seventy-two hours, counts are made to determine living and dead insects.

Housefly evaluation tests differ in this respect: The toxicant is dissolved in a volatile solvent, preferably acetone, the active compound is pipetted into a petri dish bottom, allowed to air dry and placed in a cardboard mailing tube. Twenty-five female flies are caged in the tube. The flies are continuously exposed to the known residue of the active compound in the cage. After twenty-four and forty-eight hours, counts are made to deter- The compounds of the present invention may be applied to a pest habitat in ways well known to those skilled in the art such as dusts, sprays of solutions or dispersions and the like.

We claim:
1. A compound of the formula

wherein $R^1$ is a lower alkyl radical, $R^2$ and $R^3$ is selected from the group consisting of hydrogen, lower alkyl radicals, and phenyl.

2. The compound 2 - (O,O-diethylphosphorodithioylmethylmercapto)-ethyl carbamate.
3. The compound 2 - (O,O-diethylphosphorodithioylmethylmercapto)-ethyl N,N-dimethylcarbamate.
4. The compound 2 - (O,O-diethylphosphorodithioylmethylmercapto)-ethyl N-ethylcarbamate.
5. The compound 2 - (O,O-diethylphosphorodithioylmethylmercapto)-ethyl N-isopropylcarbamate.
6. The compound 2 - (O,O-diethylphosphorodithioylmethylmercapto)-ethyl carbanilate.
7. The compound 2 - (O,O-diethylphosphorodithioylmethylmercapto)-ethyl N-butylcarbamate.
8. The method of killing pests comprising applying to a pest habitat a compound of claim 1.
9. The method of killing pests comprising applying to a pest habitat 2 - (O,O-diethylphosphorodithioylmethylmercapto)-ethyl carbamate.
10. The method of killing pests comprising applying to a pest habitat 2-(O,O-diethylphosphorodithioylmethylmercapto)-ethyl N,N-dimethylcarbamate.
11. The method of killing pests comprising applying to a pest habitat 2-(O,O-diethylphosphorodithioylmethylmercapto)-ethyl N-ethylcarbamate.
12. The method of killing pests comprising applying to a pest habitat 2-(O,O-diethylphosphorodithioylmethylmercapto)-ethyl N-isopropylcarbamate.
13. The method of killing pests comprising applying to a pest habitat 2-(O,O-diethylphosphorodithioylmethylmercapto)-ethyl carbanilate.
14. The method of killing pests comprising applying to a pest habitat 2-(O,O-diethylphosphorodithioylmethylmercapto)-ethyl N-butylcarbamate.

References Cited in the file of this patent
UNITED STATES PATENTS
2,981,748      Metivier _____ Apr. 25, 1961